(12) United States Patent
Inada

(10) Patent No.: US 8,860,644 B2
(45) Date of Patent: Oct. 14, 2014

(54) LIQUID CRYSTAL DISPLAY DEVICE THAT APPLIES DIFFERENT VOLTAGES IN TIME SEQUENCE TO DISPLAY GRADATION, DISPLAY METHOD, PROGRAM, AND RECORDING MEDIUM OF THE SAME

(75) Inventor: Ken Inada, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 287 days.

(21) Appl. No.: 13/517,370

(22) PCT Filed: Nov. 4, 2010

(86) PCT No.: PCT/JP2010/069624
§ 371 (c)(1),
(2), (4) Date: Jun. 20, 2012

(87) PCT Pub. No.: WO2011/092919
PCT Pub. Date: Aug. 4, 2011

(65) Prior Publication Data
US 2012/0256976 A1    Oct. 11, 2012

(30) Foreign Application Priority Data

Jan. 28, 2010 (JP) ................................. 2010-016919

(51) Int. Cl.
*G09G 3/36* (2006.01)
*G09G 3/20* (2006.01)
*G02F 1/1335* (2006.01)
*G02F 1/13* (2006.01)

(52) U.S. Cl.
CPC ............ *G09G 3/2007* (2013.01); *G09G 3/3611* (2013.01); *G02F 2001/133601* (2013.01); *G02F 1/1323* (2013.01); *G09G 2320/0673* (2013.01); *G09G 2358/00* (2013.01); *G09G 2320/068* (2013.01); *G02F 2203/30* (2013.01); *G09G 2320/0686* (2013.01); *G09G 2320/028* (2013.01)
USPC ........................................... 345/89; 345/690

(58) Field of Classification Search
CPC .................................................... G09G 3/2007
USPC ............ 345/76, 98, 102, 212, 690, 84, 87, 89
See application file for complete search history.

(56) References Cited

U.S. PATENT DOCUMENTS 6,556,180 B1 * 4/2003 Furuhashi et al. .............. 345/87
8,063,922 B2 * 11/2011 Masuda et al. ................ 345/691
(Continued)

FOREIGN PATENT DOCUMENTS

JP    2001-147673    5/2001
JP    2007-94230     4/2007
(Continued)

OTHER PUBLICATIONS

Search Report mailed Dec. 7, 2010, directed to International Patent Application No. PCT/JP2010/069624; 2 pages.

*Primary Examiner* — Pegeman Karimi
(74) *Attorney, Agent, or Firm* — Morrison & Foerster LLP

(57) ABSTRACT

In a first display period, a light source controlling section controls a backlight to emit light having a given intensity, and in order to display a given gradation in a first region which is a part of the image, a gradation voltage generating section applies a voltage which is in accordance with the given gradation, and in a second display period which is different from the first display period, the light source controlling section controls the backlight to emit light having a lower intensity than the intensity of the given intensity of the light emitted in the first display period, and in order to display the given gradation in a second region which is different from the first region, the gradation voltage generating section applies a higher voltage than the voltage applied to display the given gradation in the first region.

6 Claims, 13 Drawing Sheets

(56) References Cited

U.S. PATENT DOCUMENTS

| | | |
|---|---|---|
| 2007/0040780 A1 | 2/2007 | Gass et al. |
| 2007/0120799 A1* | 5/2007 | Tanaka et al. .................. 345/98 |
| 2008/0180385 A1* | 7/2008 | Yoshida et al. ............... 345/102 |
| 2010/0066932 A1* | 3/2010 | Huh et al. ....................... 349/38 |
| 2011/0157260 A1* | 6/2011 | Pyun et al. .................... 345/691 |

FOREIGN PATENT DOCUMENTS

| | | |
|---|---|---|
| JP | 2008-281768 | 11/2008 |
| JP | 2008-283578 | 11/2008 |
| JP | 2009-64025 | 3/2009 |
| JP | 2009-222943 | 10/2009 |

* cited by examiner

LIQUID CRYSTAL DISPLAY DEVICE THAT APPLIES DIFFERENT VOLTAGES IN TIME SEQUENCE TO DISPLAY GRADATION, DISPLAY METHOD, PROGRAM, AND RECORDING MEDIUM OF THE SAME

REFERENCE TO RELATED APPLICATIONS

This application is a national stage application under 35 USC 371 of International Application No. PCT/JP2010/069624, filed Nov. 4, 2010, which claims priority from Japanese Patent Application No. 2010-016919 filed Jan. 28, 2010, the entire contents of which are incorporated herein by reference.

FIELD OF THE INVENTION

The present invention relates to a liquid crystal display device which displays an image in accordance with a viewing angle. The present invention also relates to a display method carried out in the liquid crystal display device, a program and a recording medium.

BACKGROUND OF THE INVENTION

Conventionally, there are demands for prevention of a peep at a mobile terminal such as a mobile phone from the perspective of privacy protection. Given such demands, various peep prevention techniques have been proposed. Such a peep prevention technique is exemplified by a technique using a viewing angle characteristic of liquid crystal.

Patent Literature 1 discloses a technique for switching between a wide viewing mode and a narrow viewing mode in a liquid crystal display device which causes a liquid crystal display to display an image. The wide viewing mode causes a display surface to be viewed at a wide viewing angle, whereas the narrow viewing mode causes the display surface to be viewed at a narrow viewing angle.

According to the technique, in the wide viewing mode, an identical image is seen on the display surface when the display surface is viewed either from the front or obliquely. In contrast, in the narrow viewing mode, an image (a main image) similar to the image seen in the wide viewing mode is seen when the display surface is viewed from the front, whereas a composed image obtained by composing a sub image which is completely different from the main image is seen when the display surface is viewed obliquely. This enables a user who wishes to protect privacy to prevent a peep by causing the display surface to be viewed in the narrow viewing mode.

Patent Literature 2 discloses the following technique. According to the technique, liquid crystal molecules in a pixel are aligned in two or more directions, so that a display panel has different transmittances when viewed from a vertical direction with respect to the display panel and when viewed from a direction which deviates from the vertical direction. This blurs an image which is seen by an observer located in a direction other than the vertical direction.

Patent Literature 3 discloses a technique for making it difficult to recognize an image or voice output state when a device detects a user who is different from a user who has logged in to the device.

Japanese Patent Application Publication, Tokukai, No. 2009-222943 (Publication Date: Oct. 1, 2009)

Japanese Patent Application Publication, Tokukai, No. 2009-64025 (Publication Date: Mar. 26, 2009)

Japanese Patent Application Publication, Tokukai, No. 2008-283578 (Publication Date: Nov. 20, 2008)

SUMMARY OF THE INVENTION

However, the conventional techniques mentioned above have the following problems.

According to the method disclosed in Patent Literature 1, a pattern which is supposed to be seen visible when seen obliquely is visible in the image viewed from the front when a display is carried out in the narrow viewing mode. That is, as shown in FIG. 13, in order for a checkered pattern to be displayed when the display surface is viewed obliquely, in one of two regions (see (a) of FIG. 13), each of four adjacent pixels displays a gradation in accordance with pixel data of an original image (inputted pixel data), whereas in the other of the two regions (see (b) of FIG. 13), the pixel data is changed so that the changed pixel data is identical in luminance to the original image. That is, in one of the two regions, adjacent pixels display an identical gradation in accordance with an input gradation, whereas in the other of the two regions, adjacent pixels are adjusted to display gradations which are different in value, and pixel data is adjusted so that an average of gradations of respective four pixels is identical to the input gradation. FIG. 13, which shows a conventional technique, illustrates a relationship between pixel data and an average luminance of adjacent pixels in a first display region and a second display region. Of four pixels in the other of the two regions, the pixels on the upper left and the lower right have a luminance of 0%, and the pixels on the upper right and the lower left have a luminance of 100%. This means that an image is seen differently in the two regions. That is, a method in which an intended gradation is displayed as an aggregate of pixels by balancing gradations of respective adjacent pixels causes the pixels to significantly differ in luminance. As a result, a problem occurs in which a pattern is visible also when the display surface is viewed from the front.

In this case, gamma curves obtained when a display is viewed from the front and when the display is viewed obliquely are as shown in FIG. 14. (a) of FIG. 14, which shows a conventional technique, illustrates gamma characteristics obtained when a display is viewed from the front and when the display is viewed obliquely, and (b) of FIG. 14, which shows a conventional technique, illustrates gamma characteristics obtained when different voltages are applied to the first display region and the second display region.

Neither Patent Literature 2 nor Patent Literature 3 discloses a technique for causing a pattern to be less visible when a display is viewed from the front.

The present invention has been made in view of the problems, and an object of the present invention is to provide a liquid crystal display device which not only protects user's privacy but also improves a display quality of an image when a display is viewed from the front.

In order to attain the object, a liquid crystal display device in accordance with the present invention includes: obtaining means for obtaining image data; a display which displays an image represented by the image data thus obtained; light source controlling means for controlling an intensity of light emitted from a light source; and application means for applying a voltage to a respective plurality of pixels provided in the display, in a first display period, the light source controlling means controlling the light source to emit the light having a given intensity, and in order to display a given gradation in a first region which is a part of the image, the application means applying the voltage which is in accordance with the given gradation, and in a second display period which is different from the first display period, the light source controlling means controlling the light source to emit light having a lower intensity than the given intensity of the light emitted in the first display period, and in order to display the given gradation in a second region which is a part of the image and is different from the first region, the application means applying a higher voltage than the voltage applied to display the given gradation in the first region.

In order to attain the object, a display method in accordance with the present invention includes the steps of: (a) obtaining image data; (b) displaying, in a display, an image represented by the image data thus obtained; (c) controlling an intensity of light emitted from a light source; and (d) applying a voltage to a respective plurality of pixels provided in the display, in the step (c), in a first display period, the light source being controlled to emit the light having a given intensity, and in a second display period which is different from the first display period, the light source being controlled to emit light having a lower intensity than the given intensity of the light emitted in the first display period, and in the step (d), in the first display period, the voltage being applied so as to display a given gradation in a first region which is a part of the image, the voltage being in accordance with the given gradation, and in the second display period, a higher voltage being applied so as to display the given gradation in a second region which is a part of the image and is different from the first region, the higher voltage being higher than the voltage applied to display the given gradation in the first region.

According to the arrangement, the liquid crystal display device in accordance with the present invention is arranged such that in order to display, in the display, the image data obtained by the obtaining means, the light source controlling means controls the intensity of the light emitted from the light source, and the application means applies the voltage to the respective plurality of pixels provided in the display.

According to the liquid crystal display device in accordance with the present invention, a period in which the image is displayed in the display, i.e., a period in which the image data are written to the respective plurality of pixels is divided into a plurality of periods. In a first display period, the light source controlling means controls the light source to emit the light having a given intensity, and in a second display period which is different from the first display period, the light source controlling means controls the light source to emit light having a lower intensity than the given intensity of the light emitted in the first display period. Meanwhile, in the first display period, the application means applies a voltage so as to display a given gradation in a first region which is a part of the image, the voltage being in accordance with the given gradation, and in the second display period, the application means applies a higher voltage so as to display the given gradation in a second region which is different from the first region, the higher voltage being higher than the voltage applied to display the given gradation in the first region.

As described earlier, the liquid crystal display device of the present invention carries out control so that image data are written to the first region and the second region at different light emission intensities and at different applied voltages, whereas an identical gradation is displayed. This enables the display to display an image differently depending on whether the image is viewed from the front or obliquely.

That is, the display of the liquid crystal display device in accordance with the present invention is a liquid crystal display. A gamma characteristic of the liquid crystal display varies depending on whether a screen is viewed from the front or obliquely. Therefore, a change in luminance of the light source to display a given gradation causes a slight change in screen viewed from the front, but causes a significant change in screen viewed obliquely. The liquid crystal display device 1 uses this characteristic to divide a part of the screen into the first region and the second region. Then, in order to display a given gradation shared by these regions, the liquid crystal display device causes the light source to emit light at different intensities and applies, to a pixel, a voltage which allows the given gradation to be displayed in accordance with the different intensities. According to this, a pattern which is supposed to be visible when seen obliquely is less visible to a user of the liquid crystal display device who views the display from the front, whereas a pattern such as a checkered pattern is displayed so as to be visible to another user that is different from the user of the liquid crystal display device and views the display obliquely.

In addition, unlike a conventional technique, the liquid crystal display device of the present invention is not arranged to achieve an intended luminance factor by causing adjacent pixels to have different luminance factors and averaging the different luminance factors. In other words, the liquid crystal display device is not arranged to (i) cause adjacent pixels, i.e., data to be written to the adjacent pixels, to have different luminance factors and (ii) display an intended gradation by generating a half tone of these pixels. Therefore, the liquid crystal display device in accordance with the present invention causes no uncomfortable feeling about a display when the display is viewed from the front, the uncomfortable feeling being caused by a difference in luminance factor among a plurality of adjacent pixels. Further, the liquid crystal display device causes a pattern which is visible when seen obliquely to be less visible. Accordingly, the liquid crystal display device can not only protect user's privacy but also improve a display quality of an image when the display is viewed from the front.

The liquid crystal display device in accordance with the present invention is arranged as follows: In a first display period, the light source controlling means controls the light source to emit the light having a given intensity, and in order to display a given gradation in a first region which is a part of the image, the application means applies the voltage which is in accordance with the given gradation. In a second display period which is different from the first display period, the light source controlling means controls the light source to emit light having a lower intensity than the given intensity of the light emitted in the first display period, and in order to display the given gradation in a second region which is a part of the image and is different from the first region, the application means applies a higher voltage than the voltage applied to display the given gradation in the first region. Therefore, the liquid crystal display device can not only protect user's privacy but also improve a display quality of an image when the display is viewed from the front.

Figure 14:
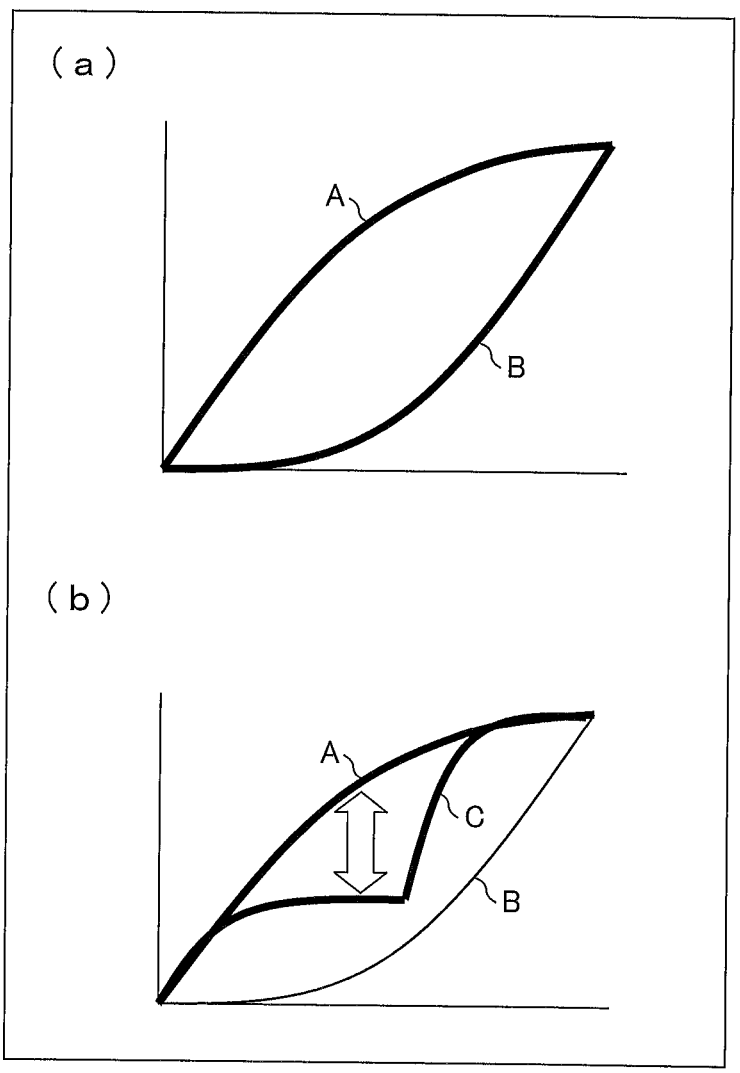
FIG. 14

(a) of FIG. 14, which shows a conventional technique, illustrates gamma characteristics obtained when a display is viewed from the front and when the display is viewed obliquely, and (b) of FIG. 14, which shows a conventional technique, illustrates gamma characteristics obtained when different voltages are applied to the first display region and the second display region.

DETAILED DESCRIPTION OF THE INVENTION

An embodiment of the present invention is described below with reference to FIGS. 1 to 5.

[Outline of Liquid Crystal Display Device]

Figure 1:
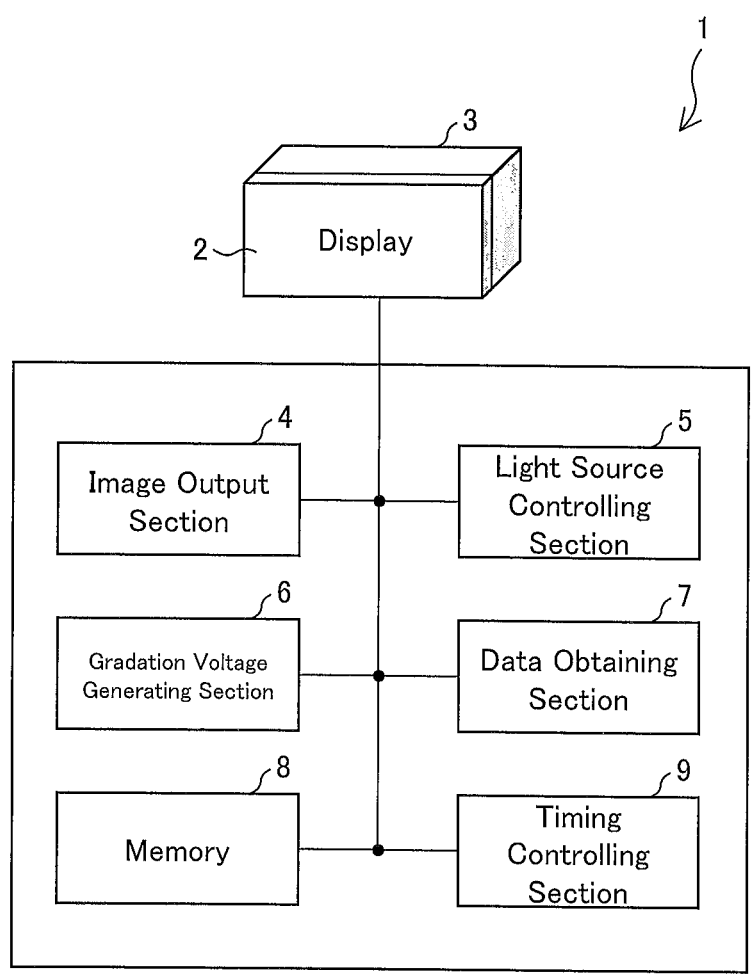
FIG. 1 is a block diagram showing an arrangement of relevant parts of a liquid crystal display device in accordance with an embodiment of the present invention.

An arrangement of a liquid crystal display device 1 is to be described with reference to FIG. 1. FIG. 1 is a block diagram showing an arrangement of relevant parts of the liquid crystal display device 1 in accordance with the present embodiment.

The liquid crystal display device 1 includes a display 2, a backlight (light source) 3, an image output section 4, a light source controlling section (light source controlling means) 5, a gradation voltage generating section (application means) 6, a data obtaining section (data obtaining means) 7, a memory (storage means) 8, and a timing controlling section 9.

According to the liquid crystal display device 1, the display 2 has a privacy protection function. Privacy protection herein refers to a technique for making it difficult for a person other than a user of a device to recognize an image, especially a letter displayed in the display 2. Specifically, in order to cause the display 2 to display image data obtained by the data obtaining section 7, the light source controlling section 5 controls light emitted from the backlight 3, and the gradation voltage generating section 6 applies a voltage to a respective plurality of pixels provided in the display 2. Such privacy protection as mentioned above is thus achieved.

According to the liquid crystal display device 1, a period in which an image is displayed in the display 2, i.e., a period in which image data is written to each pixel is divided into a plurality of periods. In a given display period (first display period), the light source controlling section 5 controls the backlight 3 to emit light having a given intensity. In another display period (a second display period) that is different from the first display period, the light source controlling section 5 controls the backlight 3 to emit light which is lower in intensity than the light emitted in the first display period. In the first display period, the gradation voltage generating section 6 applies a voltage in accordance with a given gradation in a first region which is a part of the image, so as to display the given gradation. In the second display period, the gradation voltage generating section 6 applies a voltage higher than the voltage applied to display the given gradation in the first region, so as to display the given gradation in a second region, which is different from the first region.

As described earlier, the liquid crystal display device 1 carries out control so that image data are written to the first region and the second region at different light emission intensities and at different applied voltages, whereas an identical gradation is displayed. This enables the display 2 to display an image differently depending on whether the image is viewed from the front or obliquely.

That is, the liquid crystal display device 1 in accordance with the present embodiment uses a viewing angle characteristic of the display 2, so as to cause an image displayed in the display 2 to be seen differently depending on whether the display 2 is viewed from the front or obliquely. The viewing angle characteristic of the display 2 herein refers to gamma characteristic. The gamma characteristic varies depending on a location of an observer of the display 2. This causes an image displayed in the display to be seen differently.

Specifically, the display 2 displays a normal image when viewed from the front, whereas, when viewed obliquely, the display 2 displays a pattern such as a checked pattern by causing the pattern to overlap with the normal image. The normal image herein refers to an image which is supposed to be displayed in accordance with obtained image data to which no modification is made. This allows a normal image to be visible to a user of the liquid crystal display device 1 who views the display 2 from the front. However, a person who is different from the user and peeps at the display 2 obliquely (transversely) has difficulty in recognizing the normal image. This enables protection of user's privacy.

According to the present embodiment, the first display period and the second display period are repeated alternately and are identical in duration. However, the present invention is not limited to this, and it is only necessary to determine the duration in accordance with, for example, specifications of a device.

As described earlier, according to the liquid crystal display device 1, in a case where an image displayed in the display 2 is divided into a plurality of regions and a gradation is displayed differently in different regions, the image displayed in the display 2 is seen differently depending on whether the image is seen from the front or obliquely. Namely, the liquid crystal display device 1 causes a change in (i) intensity of light emitted from the back light 3 and (ii) voltage applied to the respective plurality of pixels provided in the display 2 between when a given gradation in the first region is displayed and when the given gradation in the second region is displayed.

Note here that the display 2 of the liquid crystal display device 1 in accordance with the present embodiment is a liquid crystal display. A gamma characteristic of the liquid crystal display varies depending on whether a screen is viewed from the front or obliquely. Therefore, a change in luminance of the backlight 3 to display a given gradation causes a slight change in screen viewed from the front, but causes a significant change in screen viewed obliquely. The liquid crystal display device 1 uses this characteristic to divide a part of the screen into the first region and the second region. Then, in order to display a given gradation shared by these regions, the liquid crystal display device 1 causes the backlight 3 to emit light at different intensities and applies, to a pixel, a voltage which allows the given gradation to be displayed in accordance with the different intensities. According to this, a pattern which is supposed to be visible when seen obliquely is less visible to the user of the liquid crystal display device 1 who views the display 2 from the front, whereas the pattern is displayed so as to be visible to another user that is different from the user of the liquid crystal display device 1 and views the display 2 obliquely.

It is only necessary that each of the first region and the second region be a part of a displayed image, i.e., a part of a region of the display 2. It is not particularly limited in how many first and second regions are provided in which region of the displayed image. Namely, the display 2 is divided into a plurality of regions, and all or a part of the regions obtained by the division can be separated into first regions and second regions. It is only necessary to provide the first regions and the second regions so that a shaded pattern is produced when the display 2 is viewed obliquely, e.g., so that a desired pattern appears when the display 2 is viewed obliquely. Such a desired pattern may be a checked pattern in which a second region is provided so as to be adjacent to a plurality of first regions.

In addition, unlike a conventional technique, the liquid crystal display device 1 in accordance with the present embodiment is not arranged to achieve an intended luminance factor by causing adjacent pixels to have different luminance factors and averaging the different luminance factors. In other words, the liquid crystal display device 1 is not arranged to (i) cause adjacent pixels, i.e., data to be written to the adjacent pixels, to have different luminance factors and (ii) display an intended gradation by generating a half tone of these pixels. According to the liquid crystal display device 1, a luminance of the backlight 3 and a voltage to be applied to a pixel are controlled in adjacent pixels, so that an identical gradation is displayed in the adjacent pixels. Accordingly, since adjacent pixels are identical in luminance factor, a pattern which is supposed to be visible when seen obliquely can be prevented from being seen from the front, and a display quality of an image can be improved.

[Specific Arrangement of Each Member of the Liquid Crystal Display Device 1]

Next, the following description discusses functions of each block of the liquid crystal display device 1.

The display 2 displays an image represented by image data which is obtained by the data obtaining section 7 and then supplied from the image output section 4.

The backlight 3 emits (outputs) light from a backside of the display 2. An intensity of light emitted from the backlight 3 is controlled by the light source controlling section 5.

The image output section 4 supplies, to the display 2, the image data obtained by the data obtaining section 7. Specifically, the image output section 4 outputs image data in accordance with control by the timing controlling section 9.

The light source controlling section 5 controls the intensity of light emitted from the backlight 3. Specifically, the light source controlling section 5 controls the backlight 3 to emit light having different intensities in a plurality of display periods. According to the present embodiment, the light source controlling section 5 causes the backlight 3 to emit light having different intensities in the first display period and the second display period. The intensity of light emitted in each of these periods is not particularly limited, and it is only necessary to appropriately select the intensity in accordance with, for example, specifications of a device.

The gradation voltage generating section 6 applies a voltage to a respective plurality of pixels provided in the display 2. Specifically, in order to display a given gradation in each of different regions each of which is a part of an image, the gradation voltage generating section 6 applies a voltage in accordance with the given gradation. In this case, even if an identical gradation is displayed, different voltages are applied to the pixels in each of the first region and the second region in accordance with the intensity of the emitted light determined by the light source controlling section 5.

The data obtaining section 7 obtains image data representing an image to be displayed in the display 2. A source from which image data is obtained is not particularly limited. The source is exemplified by a mobile phone, a mobile game machine, a PDA, a digital camera, a laptop, and an electronic book. Alternatively, image data can be obtained via, for example, the Internet. Image data to be obtained may be a still image or a moving image. The image data to be obtained is exemplified by a book (text), a photograph, a slide show, and a word processor document.

The memory 8 stores a gradation in a pixel in an image (a given gradation) and a voltage which is applied by the gradation voltage generating section 6 so that the gradation and the voltage correspond to each other. Specifically, for each intensity of light emitted from the backlight 3, the memory 8 stores a given gradation and a voltage so that the given gradation and the voltage correspond to each other. That is, in a case where the light source controlling section 5 has determined a luminance of the backlight 3, the gradation voltage generating section 6 can determine a voltage to apply in accordance with the correspondence stored in the memory 8.

The timing controlling section 9 controls a timing at which the image output section 4 outputs image data. The timing controlling section 9 also controls a timing at which the light source controlling section 5 changes its control of backlight 3 or a timing at which the gradation voltage generating section 6 changes a voltage to apply. In other words, the timing controlling section 9 switches between the first display period and the second display period, so as to change a luminance of the backlight 3 and an applied voltage.

[Detailed Description of Display Preventing Peep]

The following description discusses how a display which prevents a peep is carried out in the liquid crystal display device 1 in accordance with the embodiment of the present invention.

Figure 2:
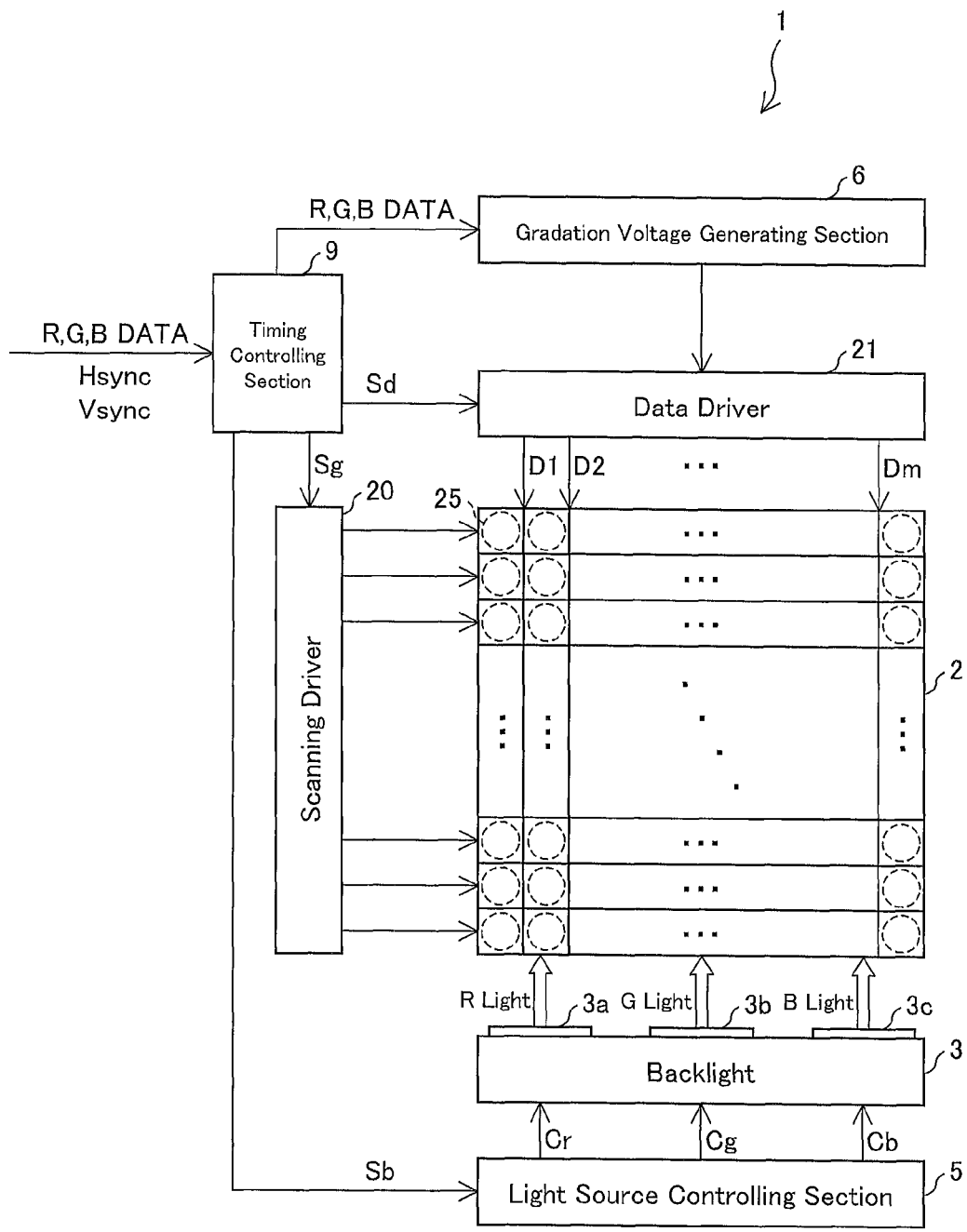
FIG. 2 is a block diagram showing a specific internal arrangement of the liquid crystal display device in accordance with the embodiment of the present invention.

First, the data obtaining section 7 which has received an input signal containing image data supplies the input signal to the timing controlling section 9 (see FIG. 2). FIG. 2 is a block diagram showing a specific internal arrangement of the liquid crystal display device 1 in accordance with the embodiment of the present invention.

In accordance with the input signal, the timing controlling section 9 supplies a control signal to each of the gradation voltage generating section 6 and the light source controlling section 5. The timing controlling section 9 also supplies the control signal to each of a scanning driver 20 and a data driver

21. The light source controlling section 5 controls the backlight 3 to output a given intensity of light in accordance with the received control signal.

Figure 3:
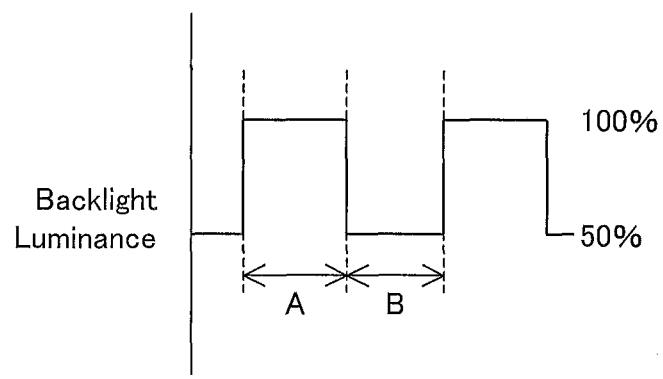
FIG. 3 shows a luminance of a backlight for each display period of the liquid crystal display device in accordance with the embodiment of the present invention.

For example, the light source controlling section 5 causes the backlight 3 to output light at a luminance of 100% in the first display period (a period of "A" shown in FIG. 3) and at a luminance of 50% in the second display period (a period of "B" shown in FIG. 3) (see FIG. 3). Namely, the light source controlling section 5 controls the backlight 3 to emit, in the first display period, light having a given intensity and to emit, in the second display period, light which is lower in intensity than the light emitted in the first display period. Note that it is not particularly limited and is only necessary to appropriately change, in accordance with, for example, a characteristic of a device to be used, in which of the first display period and the second display period and at what luminance the light is outputted. In any case, it is only necessary that the backlight 3 output light having different intensities in the first display period and the second display period.

The gradation voltage generating section 6 applies a voltage to a respective plurality of pixels provided in the display 2 in accordance with the received control signal. Namely, the gradation voltage generating section 6 supplies the control signal to the data driver 21, so as to supply an electric current to the respective plurality of pixels.

In this case, in the first display period, the gradation voltage generating section 6 applies a voltage in accordance with a given gradation in the first region which is a part of an image. In the second display period, the gradation voltage generating section 6 applies a voltage higher than the voltage applied to display the given gradation in the first region, so as to display the given gradation in the second region. Namely, in order to display an identical gradation in the first region and the second region, the gradation voltage generating section 6 causes a voltage applied to the second region to be higher than a voltage applied to the first region.

That is, in order to display an identical gradation in the first region and the second region, it is only necessary that a combination of a luminance of the backlight 3 and a voltage applied to a pixel allow a given gradation to be displayed. For example, in order to display a given gradation, it is only necessary that (i) in the first region, a luminance factor of the backlight 3 be 100% and a voltage application rate be 50% and (ii) in the second region, a luminance factor of the backlight 3 be 50% and a voltage application rate be 100%.

Figure 4:
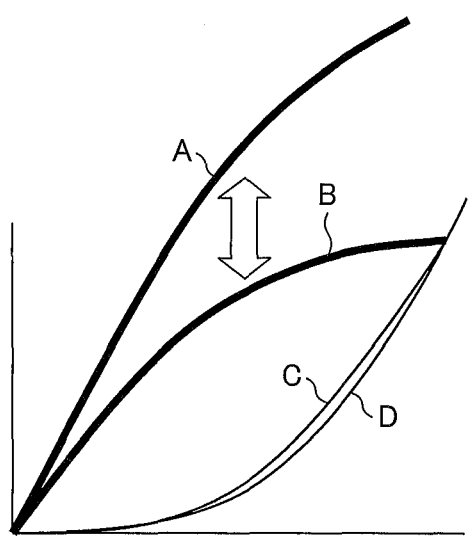
FIG. 4 shows gamma characteristics obtained, in the liquid crystal display device in accordance with the embodiment of the present invention, when a display is viewed from the front and when the display is viewed obliquely.

Note that it is only necessary to set a voltage applied to a pixel to, for example, a voltage which is stored in the memory 8 so as to correspond to a luminance of the backlight 3 and a gradation to be displayed. Gamma characteristics obtained when a display is viewed from the front and when the display is viewed obliquely form curves as shown in FIG. 4. FIG. 4 shows gamma characteristics obtained, in the liquid crystal display device in accordance with the embodiment of the present invention, when the display 2 is viewed from the front and when the display is viewed obliquely.

Namely, when the display 2 is viewed from the front, there is no difference between a gamma curve of the first region (indicated by "C" in FIG. 4) and a gamma curve of the second region (indicated by "D" in FIG. 4). In contrast, when the display 2 is viewed obliquely, there is a significant difference between a gamma curve of the first region (indicated by "A" in FIG. 4) and a gamma curve of the second region (indicated by "B" in FIG. 4). Accordingly, there is a large luminance difference between the first region and the second region when the display 2 is viewed obliquely. Such a luminance difference appears as a shaded pattern.

Note that it is preferable that, in the first display period, the gradation voltage generating section 6 (i) apply a voltage corresponding to a gradation of image data to a pixel which displays the first region and (ii) apply a voltage corresponding to black to a pixel which displays the second region. Further, it is preferable that, in the second display period, the gradation voltage generating section 6 apply a voltage corresponding to black to a pixel which displays the second region. This allows a pattern viewed obliquely to be more conspicuous.

Figure 5:
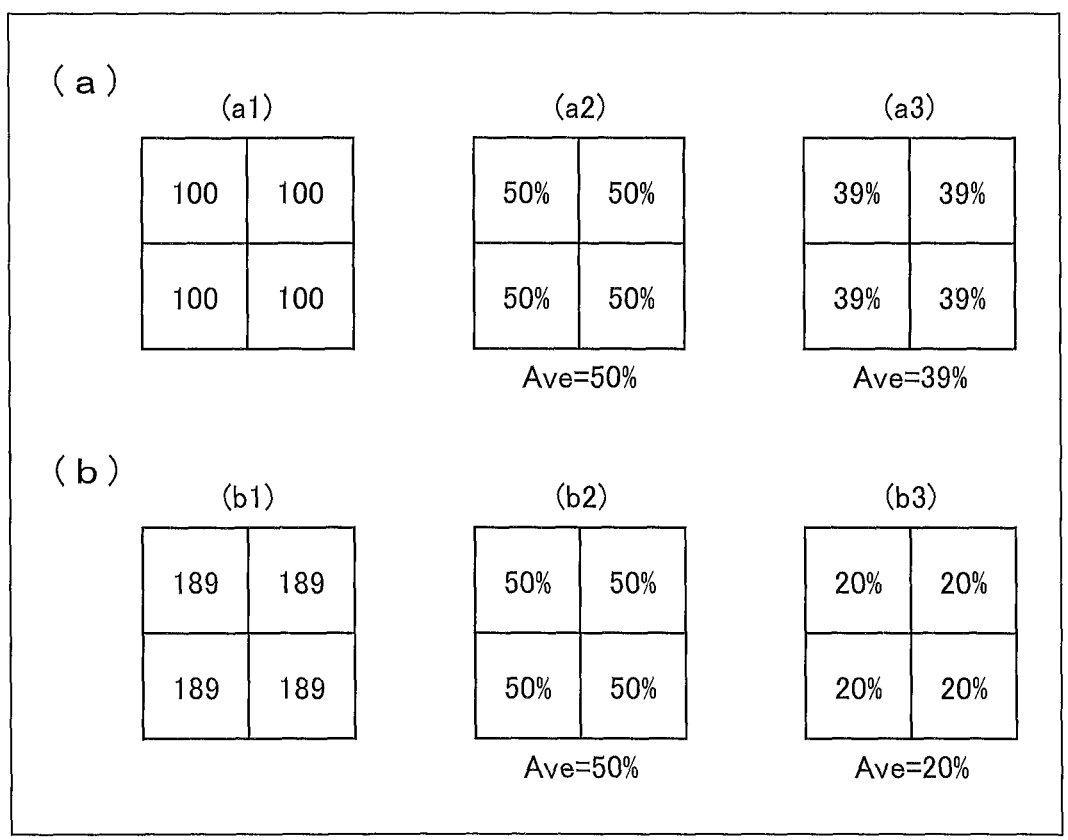
FIG. 5 shows a relationship between pixel data and an average luminance of adjacent pixels in a first display region and a second display region.

As described earlier, according to the liquid crystal display device 1 in accordance with the present embodiment, a change in luminance of the backlight 3 allows a luminance difference between the first region and the second region to be obtained when the display is viewed obliquely. That is, the liquid crystal display device 1 causes all pixel data of a group of adjacent pixels to be identical in value (see FIG. 5). Such a technique is different from a conventional technique in which in the first region, each of four adjacent pixels displays a gradation in accordance with pixel data of an original image, whereas in the second region, the pixel data is changed so that the changed pixel data is identical in luminance to the original image. FIG. 5 shows a relationship between pixel data and an average luminance of adjacent pixels in the first display region and the second display region.

Specifically, in a case where a luminance of the backlight 3 which luminance is obtained in the first region ((a) of FIG. 5) is twice as high as that obtained in the second region, in the first region, image data (a1) of four adjacent pixels which image data are transmitted to the gradation voltage generating section 6 are all set to have 100, which is approximately half the image data in the second region (b1). In this case, the luminance of all pixels in both the first region (a2) and the second region (b2) of the display viewed form the front are 50%. As described earlier, according to the liquid crystal display device 1, each of the pixels of the display viewed from the front has a constant luminance factor by causing image data of adjacent pixels in both the first region and the second region to have an identical value. Note that a change in luminance of the backlight 3 between the first region and the second region causes the first region and the second region to be identical in average luminance factor.

Meanwhile, when the display is viewed obliquely, the first region (a3) has a luminance factor of 39% and the second region (b3) has a luminance factor of 20%. As described above, a luminance difference is noticeable when the display is viewed obliquely. Such a luminance difference produces shades, which appear as a pattern.

Therefore, the liquid crystal display device 1 in accordance with the present embodiment causes no uncomfortable feeling about a display when the display is viewed from the front, the uncomfortable feeling being caused by a difference in luminance factor among a plurality of adjacent pixels. Further, the liquid crystal display device 1 causes a pattern which is visible when seen obliquely to be less visible. Accordingly, the liquid crystal display device can not only protect user's privacy but also improve a display quality of an image when the display is viewed from the front.

[Program and Recording Medium]

Finally, it is only necessary that each block included in the liquid crystal display device 1 be realized by a hardware logic. Alternatively, the each block may also be realized by software by use of a CPU (Central Processing Unit) as below.

Namely, the liquid crystal display device 1 includes (i) a CPU which executes a command of a program that implements each function of the liquid crystal display device 1, (ii) a ROM (Read Only Memory) in which the program is stored, (iii) a RAM (Random Access Memory) which extracts the control program in executable form, and (iv) a storage device (a recording medium) such as a memory in which the program and various sets of data are stored. Such an arrangement allows the object of the present invention to be attained also by a given recording medium.

It is only necessary that program codes (an executable program, an intermediate code program, and a source program) of the program of the liquid crystal display device 1 which is software that implements the each function be computer-readably recorded in such a recording medium. The recording medium is supplied to the liquid crystal display device 1. It is only necessary that the liquid crystal display device 1 serving as a computer (or a CPU or an MPU) read and carry out the program codes recorded in the recording medium thus supplied thereto.

The recording medium which supplies the program codes to the liquid crystal display device 1 is not limited to a recording medium of a specific structure or type. Namely, examples of the recording medium include (i) tapes such as a magnetic tape and a cassette tape, (ii) disks including magnetic disks such as a floppy (Registered Trademark) disk and a hard disk, and optical disks such as a CD-ROM, an MO, an MD, a DVD, and a CD-R, (iii) cards such as an IC card (including a memory card) and an optical card, and (iv) semiconductor memories realized by a mask ROM, EPROM, EEPROM, a flash ROM, and the like.

The object of the present invention can also be achieved by allowing the liquid crystal display device 1 to be connected to a communication network. In this case, the program codes are supplied to the liquid crystal display device 1 via a communication network. It is only necessary that the communication network be capable of supplying the program codes to the liquid crystal display device 1. The communication network is not limited to a communication network of a specific type or form.

Examples of the communication network includes the Internet, an intranet, an extranet, a LAN, ISDN, VAN, a CATV communications network, a virtual private network, a telephone network, a mobile telecommunications network, and a satellite communication network.

A transmission medium of which a communication network is composed is not particularly limited. Examples of the transmission medium includes wired transmission media such as IEEE1394, a USB (Universal Serial Bus), a power-line carrier, a cable TV circuit, a telephone line, and ADSL (Asymmetric Digital Subscriber Line) and wireless transmission media such as infrared communication systems such as IrDA and a remote controller, Bluetooth (Registered Trademark), 802.11 wireless communication system, HDR, a mobile phone network, a satellite circuit, and a digital terrestrial network. Note that the present invention can also be realized in a form of a computer data signal in which the program codes are embodied by an electronic transmission and which is embedded in carrier waves.

The liquid crystal display device in accordance with the present invention is preferably arranged to further include storage means for storing, for each intensity of the light emitted from the light source, the given gradation and a value of the voltage applied by the application means so that the given gradation and the value correspond to each other.

According to the arrangement, the application means can easily apply an appropriate voltage with reference to a value stored in the storage means so as to correspond to the given gradation.

The liquid crystal display in accordance with the present invention is preferably arranged such that in the first display period, the application means applies the voltage corresponding to black to a pixel which displays the second region. The liquid crystal display in accordance with the present invention is preferably arranged such that in the second display period, the application means applies the voltage corresponding to black to a pixel which displays the first region. This allows a pattern viewed obliquely to be more conspicuous.

Note that the liquid crystal display device may be realized by a computer. In this case, (i) a program for causing the computer to operate as each section of the liquid crystal display device and (ii) a computer-readable recording medium in which the program is recorded are both encompassed in the scope of the present invention.

EXAMPLES

The following description discusses an example of the present invention with reference to FIGS. 6 to 13. However, the present invention is not limited to the present example. The example described below is arranged such that a liquid crystal display displays an image differently depending on whether the liquid crystal display is viewed from the front or obliquely.

Example 1

Figure 6:
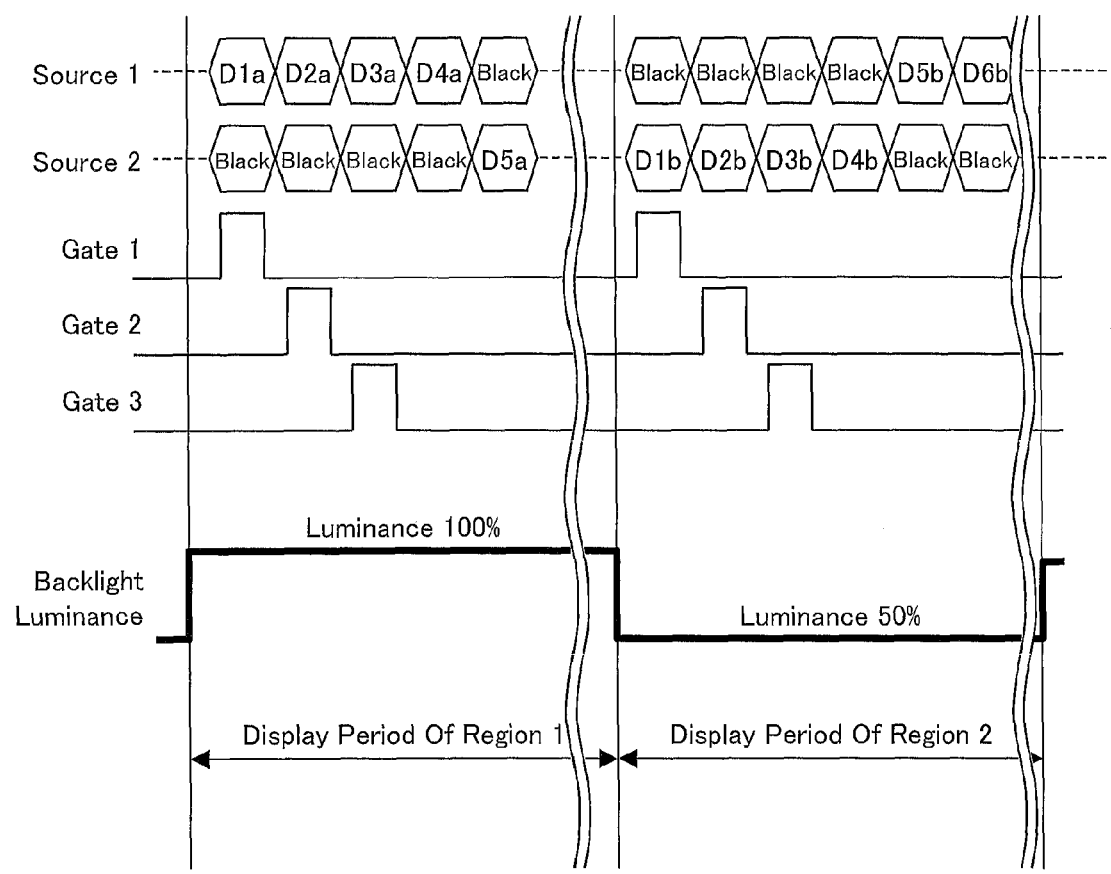
FIG. 6 shows driving waveforms obtained when a liquid crystal display device of the present invention is driven in First Example.

In Example 1, a liquid crystal display device was driven by driving waveforms as illustrated in FIG. 6. FIG. 6 shows driving waveforms by which a liquid crystal display device of the present invention is driven in Example 1.

Namely, a luminance of light emitted from the backlight was set to 100% in a display period of a region 1 (the first region) and to 50% in a display period of a region 2 (the second region). In the driving waveforms illustrated in FIG. 6, each of "D1a", "D2a", "D3a", and "D4a" on a line of a "source 1" means that image data is written, and "black" means that black data is written. Similarly, each of "D5a", "D1b", and the like on a line of a "source 2" means that image data is written. Namely, black data was written to the line of the source 2 when image data was written to the line of the source 1, and image data was written to the line of the source 2 when black data was written to the line of the source 1. Note that these source lines were controlled so that four pieces of black data were written after four pieces image data were written.

Figure 7:
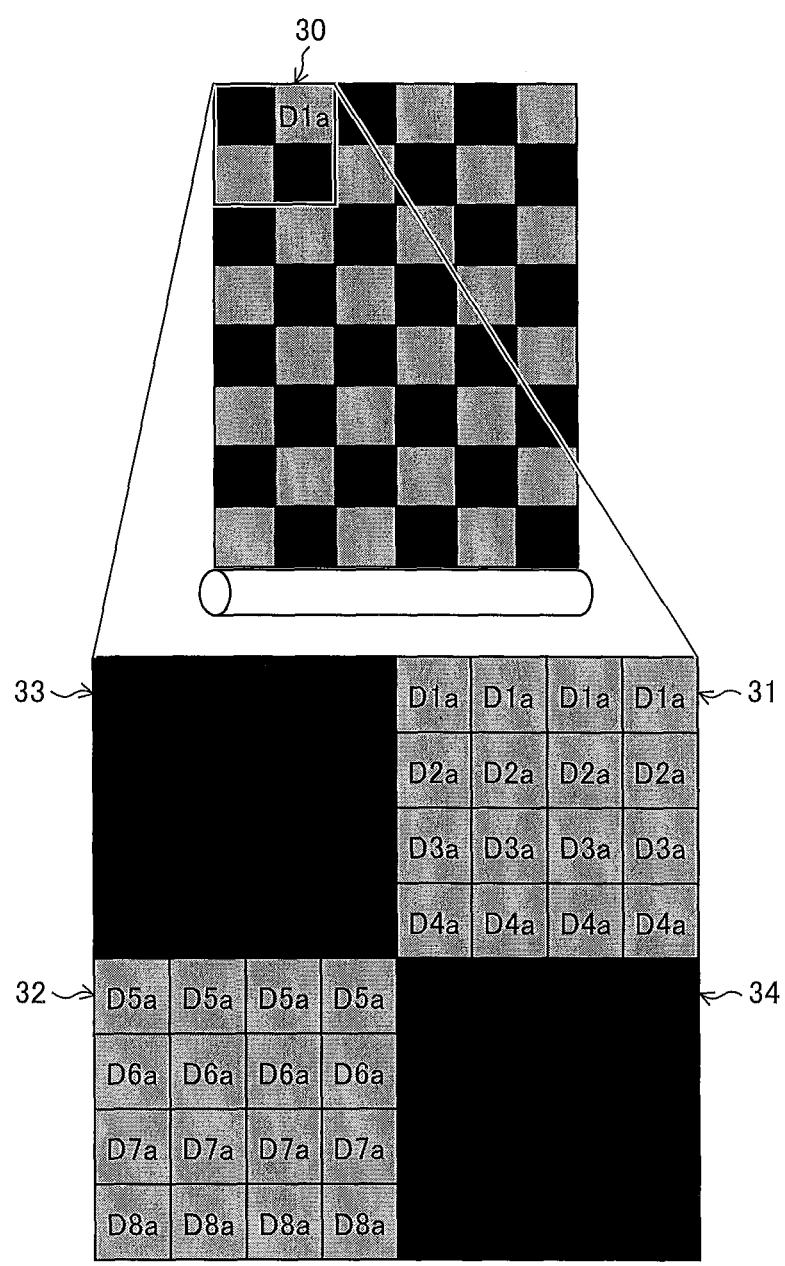
FIG. 7 shows how data is written in a display period of a region 1 when the liquid crystal display device of the present invention is driven by the driving waveforms illustrated in FIG. 6.

FIG. 7 shows how data is written in the display period of the region 1 when the liquid crystal display device of the present invention is driven by the driving waveforms illustrated in FIG. 6. FIG. 7 is a view illustrating how data is written in the display period of the region 1 when the liquid crystal display device of the present invention is driven by the driving waveforms illustrated in FIG. 6. In FIG. 7, in a case where a middle region 30 enclosing four small regions is enlarged, each of a region 31 and a region 32 is a first region, and each of a region 33 and a region 34 is a second region. Note that each of the region 31 and the region 34 corresponds to the source line 1 and each of the region 33 and the region 32 corresponds to the source line 2.

In the display period of the region 1, when a gate 1 was opened first, the image data "D1a" was written to the region 31, and the black data was written to the region 33 (see FIG. 7). Subsequently, when a gate 2 was opened, the image data "D2a" was written to the region 31, and the black data was written to the region 33. Thereafter, when a gate 3 and a gate 4 were successively opened, the respective pieces of image data "D3a" and "D4a" were written to the region 31, and the black data was written to the region 33. After the four pieces of image data were thus written to the region 31, the image data "D5a" and the like were written to the region 32 and the black data was written to the region 34.

Figure 8:
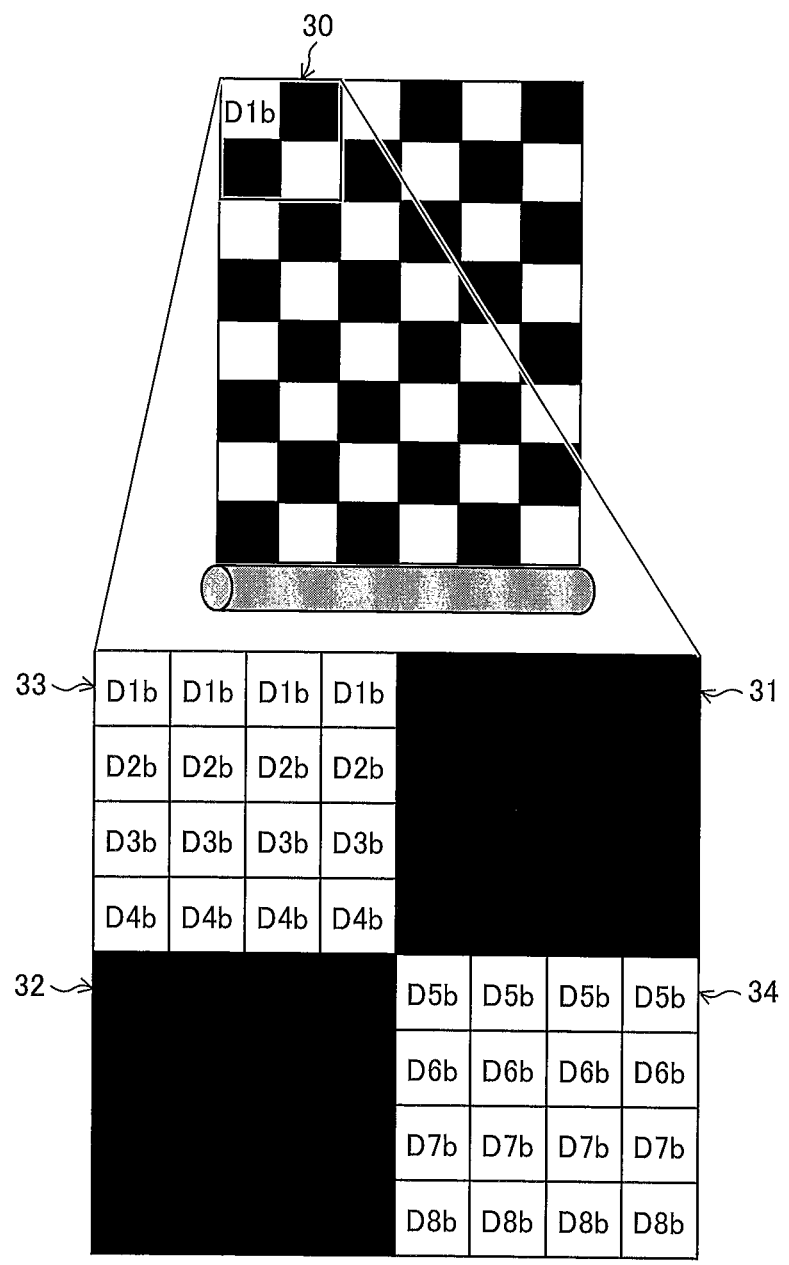
FIG. 8 shows how data is written in a display period of a region 2 when the liquid crystal display device of the present invention is driven by the driving waveforms illustrated in FIG. 6.

FIG. 8 shows how data is written in the display period of the region 2 when the liquid crystal display device of the present invention is driven by the driving waveforms illustrated in FIG. 6. FIG. 8 is a view illustrating how data is written in the display period of the region 2 when the liquid crystal display device of the present invention is driven by the driving waveforms illustrated in FIG. 6. Note that, since regions illustrated in FIG. 8 are identical to those illustrated in FIG. 7, a description thereof is omitted here.

In the display period of the region 2, when the gate 1 was opened first, the image data "D1b" was written to the region 33, and the black data was written to the region 31 (see FIG. 8). Subsequently, when the gate 2 was opened, the image data "D2b" was written to the region 33, and the black data was written to the region 31. Thereafter, when the gate 3 and the gate 4 were successively opened, the respective pieces of image data "D3b" and "D4b" were written to the region 33, and the black data was written to the region 31. After the four pieces of image data were thus written to the region 33, the image data "D5b" and the like were written to the region 34 and the black data was written to the region 32.

As described above, the liquid crystal display device of the present invention was driven so that writing of image data and black data caused a checkered pattern to appear on the display 2 which was viewed obliquely.

Figure 9:
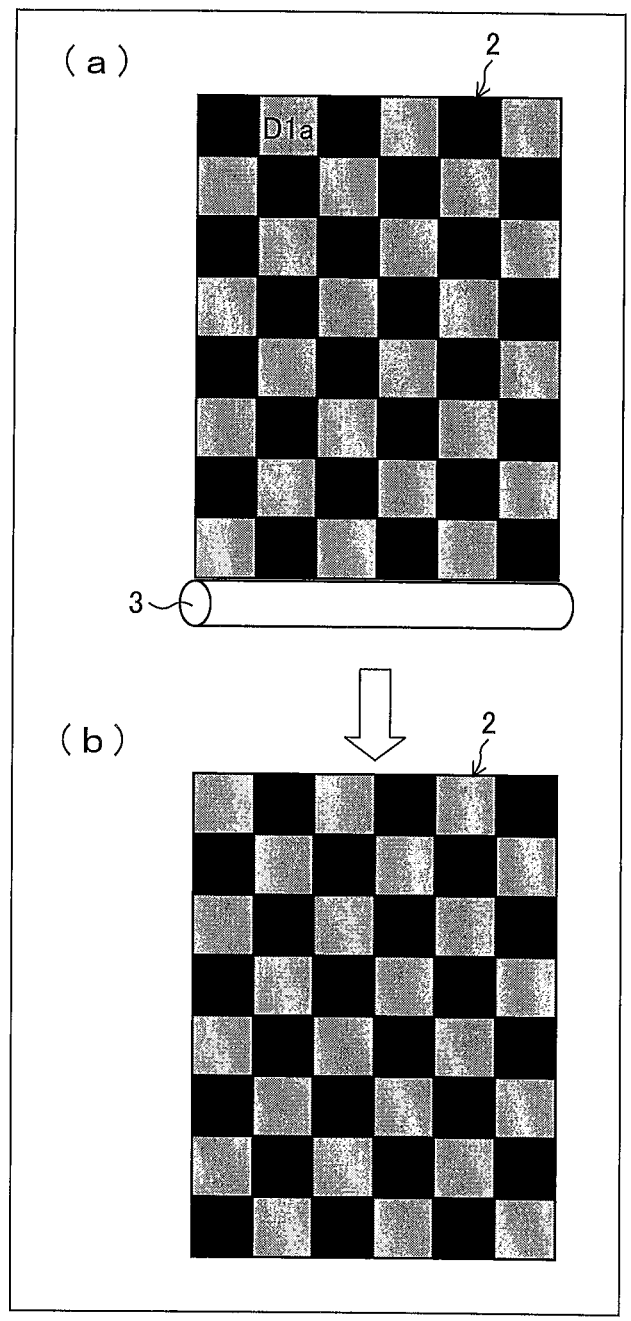
FIG. 9 shows how a display is seen in the region 1 when the liquid crystal display device of the present invention is driven by the driving waveforms illustrated in FIG. 6.

FIG. 9 shows how the display 2 is seen in the display period of the region 1 when the liquid crystal display device of the present invention is thus driven. FIG. 9 is a view illustrating how the display is seen in the region 1 when the liquid crystal display device of the present invention is driven by the driving waveforms illustrated in FIG. 6. That is, in the display period of the region 1, the backlight 3 had a luminance of 100% (see (a) of FIG. 9), whereas pixel data to be written was set to have a low value, so that the display looked grayish (see (b) of FIG. 9).

Figure 10:
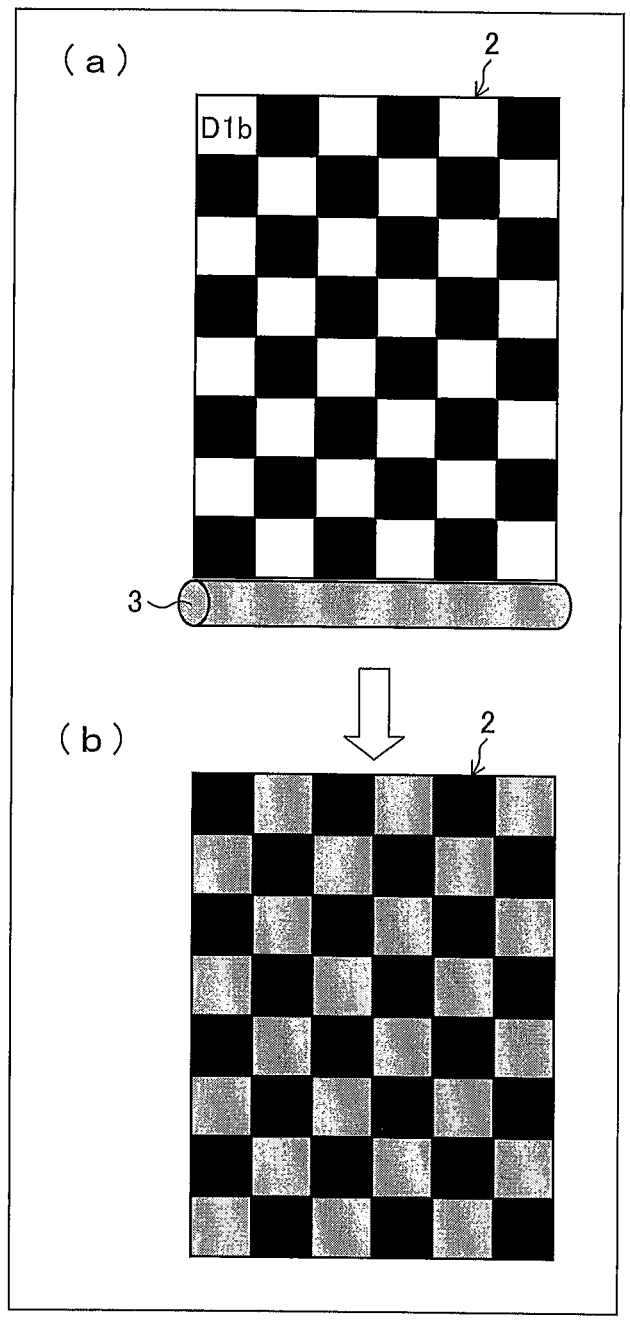
FIG. 10 shows how the display is seen in the region 2 when the liquid crystal display device of the present invention is driven by the driving waveforms illustrated in FIG. 6.

FIG. 10 shows how the display 2 is seen in the display period of the region 2. FIG. 10 is a view illustrating how the display is seen in the region 2 when the liquid crystal display device of the present invention is driven by the driving waveforms illustrated in FIG. 6. That is, in the display period of the region 2, the backlight 3 had a luminance of 50% (see (a) of FIG. 10), whereas pixel data to be written was set to have a high value, so that the display looked grayish (see (b) of FIG. 10).

Figure 11:
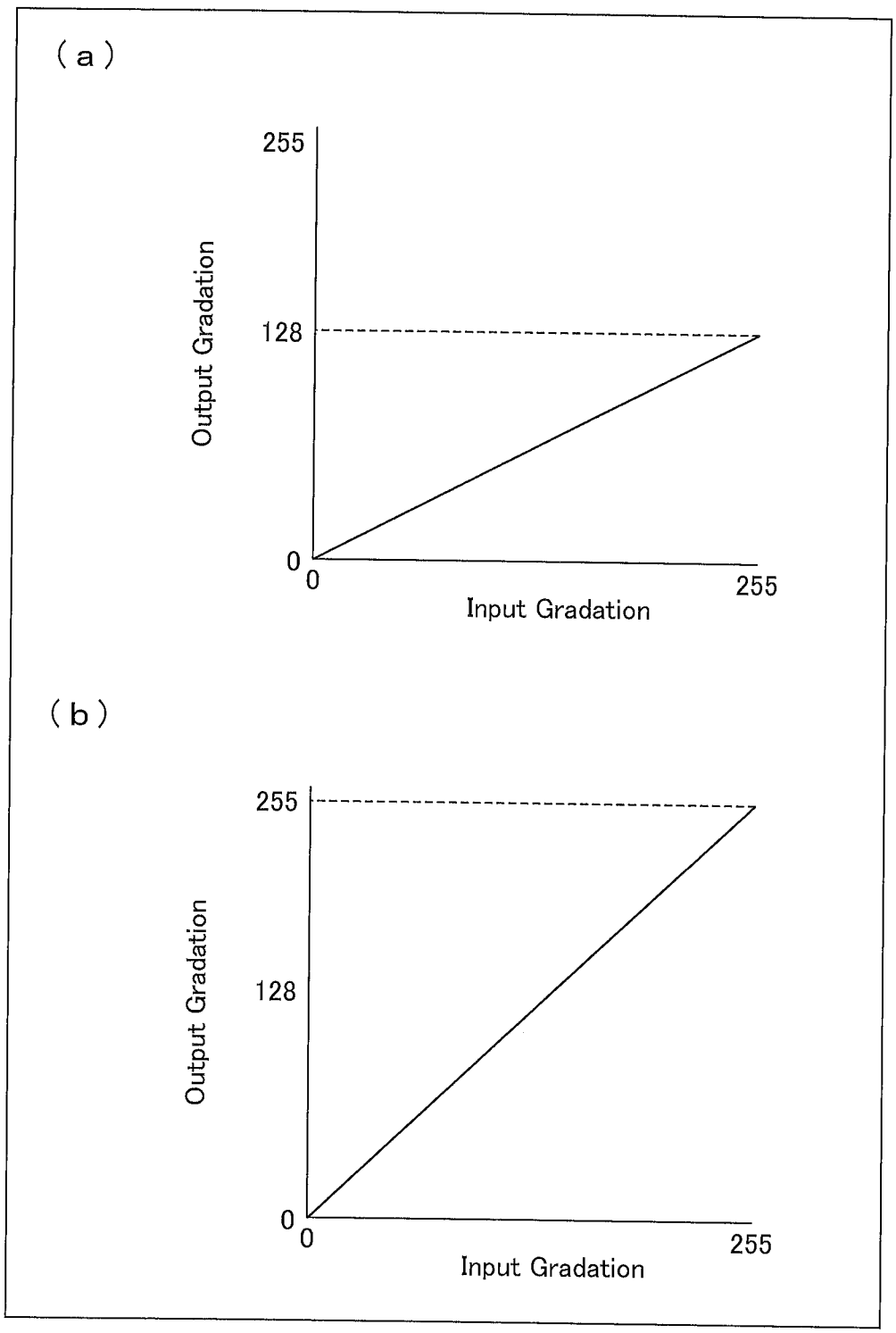
FIG. 11 has graphs each illustrating a relationship between an output gradation and an input gradation in the display periods of the respective regions 1 and 2.

That is, an output gradation of pixel data to be written in the display period of the region 1 had a value of 128, which is half the maximum output gradation (see (a) of FIG. 11). Therefore, the display looked dark though the backlight 3 had a luminance of 100%. In other words, since voltage control was carried out to cause an output gradation to be half the input gradation in the display period of the region 1, a lower gradation was displayed than an actually inputted gradation.

In contrast, an output gradation of pixel data to be written in the display period of the region 2 had the maximum output gradation (see (b) of FIG. 11). Therefore, though the backlight 3 had a lower luminance of 50%, it was possible in the region 2 to display a gradation similar to that displayed in the first region. In other words, since the luminance of the backlight 3 in the display period of the second region was half as high as that in the display period of the first region, voltage control was carried out so as to cause an output gradation and an input gradation to be equal in level, thereby compensating for the lower luminance and allowing the gradation displayed in the region 2 and the gradation in the first region to be almost equal in level. FIG. 11 has graphs each illustrating a relationship between an output gradation and an input gradation in the display periods of the respective regions 1 and 2.

Figure 12:
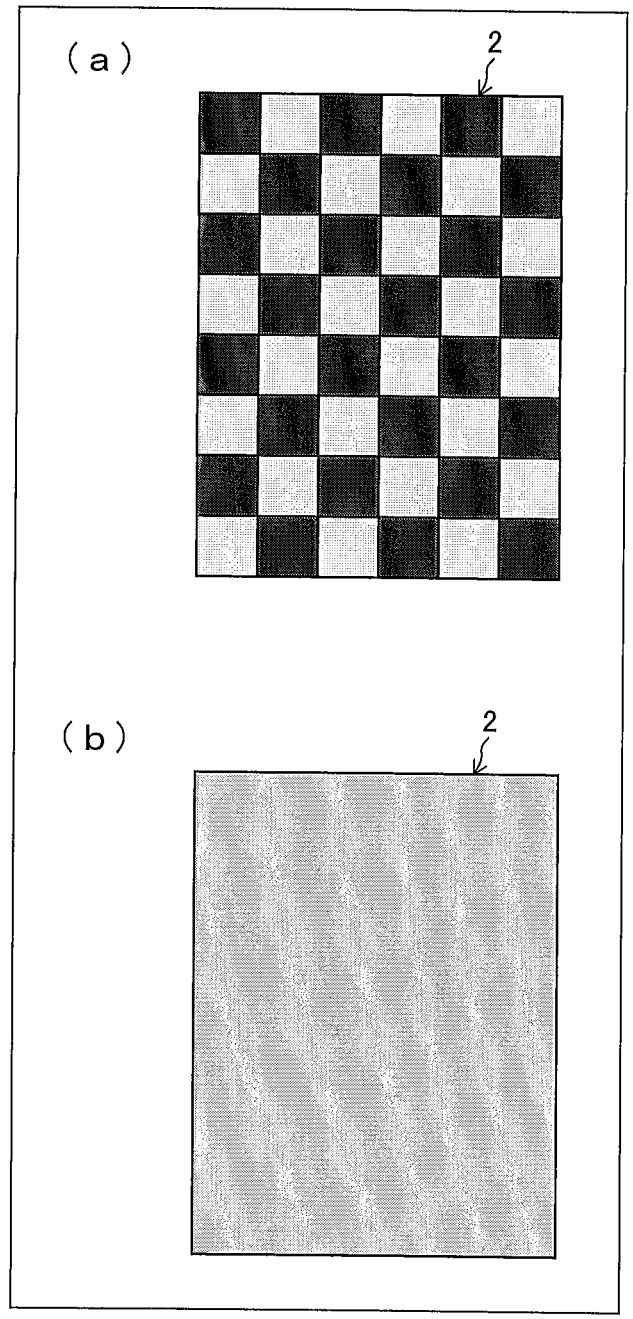
FIG. 12 shows how image data in which first display regions and second display regions are combined is seen when the liquid crystal display device of the present invention is driven by the driving waveforms illustrated in FIG. 6.
Figure 13:
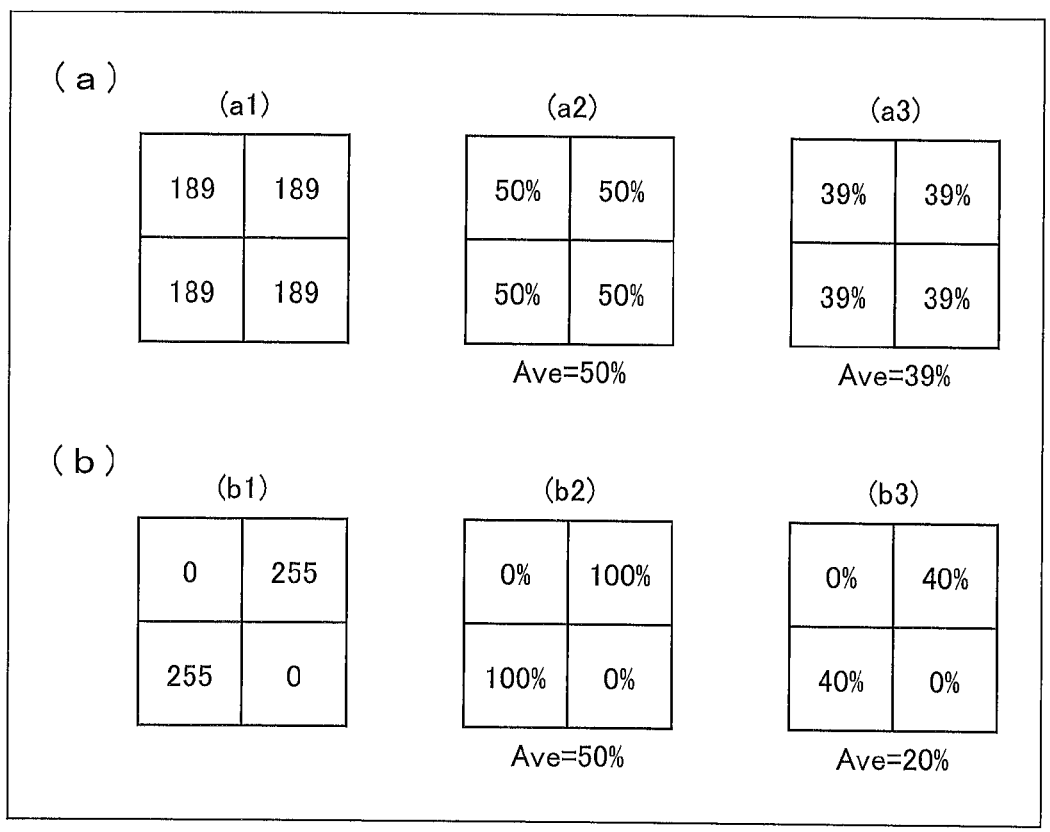
FIG. 13, which shows a conventional technique, illustrates a relationship between pixel data and an average luminance of adjacent pixels in the first and second display regions in a conventional method.

In the present Example, the display periods of the respective regions 1 and 2 were averaged, i.e., the display periods were instantly switched, so that images to be displayed in each of the regions 1 and 2 were displayed so as to be combined. As a result, a checkered pattern is visible when the liquid crystal display is viewed obliquely (see (a) of FIG. 12), whereas no checkered pattern is visible when the liquid crystal display is viewed from the front (see (b) of FIG. 12). FIG. 12 shows driving waveforms by which the liquid crystal display device of the present invention is driven in Example 1.

As described earlier, in the present example, regions to be displayed were displayed in two display periods at different luminances in the liquid crystal display device. This caused a pattern to appear when the display is viewed obliquely, and made it easy to see an original image with no pattern appearing when the display is viewed from the front. Accordingly, it was possible to not only protect user's privacy but also improve a display quality of an image when the display was viewed from the front.

The present invention is not limited to the description of the embodiments above, but may be altered by a skilled person within the scope of the claims. An embodiment based on a proper combination of technical means disclosed in different embodiments is encompassed in the technical scope of the present invention.

The liquid crystal display device in accordance with the present invention is applicable to various devices requiring privacy protection. More specifically, the liquid crystal display device can be suitably used as, for example, a mobile phone, a personal digital assistant (PDA), a laptop, an automated teller machine, and Electronic Point of Sale (EPoS).

The invention claimed is:

1. A liquid crystal display device comprising:
obtaining means for obtaining image data;
a display which displays an image represented by the image data thus obtained;
light source controlling means for controlling an intensity of light emitted from a light source; and
application means for applying a voltage to a respective plurality of pixels provided in the display,
in a first display period,
the light source controlling means controlling the light source to emit the light having a given intensity, and
in order to display a given gradation in a first region which is a part of the image, the application means applying the voltage which is in accordance with the given gradation, and
in a second display period which is different from the first display period,
the light source controlling means controlling the light source to emit light having a lower intensity than the given intensity of the light emitted in the first display period, and
in order to display the given gradation in a second region which is a part of the image and is different from the first region, the application means applying a higher voltage than the voltage applied to display the given gradation in the first region.

2. The liquid crystal display device as set forth in claim 1, further comprising storage means for storing, for each intensity of the light emitted from the light source, the given gradation and a value of the voltage applied by the application means so that the given gradation and the value correspond to each other.

3. The liquid crystal display device as set forth in claim 1, wherein in the first display period, the application means applies the voltage corresponding to black to a pixel which displays the second region.

4. The liquid crystal display device as set forth in claim 1, wherein in the second display period, the application means applies the voltage corresponding to black to a pixel which displays the first region.

5. The liquid crystal display device as set forth in claim 1, wherein the liquid crystal display device is a mobile phone or a personal digital assistant.

6. A display method comprising the steps of:
(a) obtaining image data;
(b) displaying, in a display, an image represented by the image data thus obtained;
(c) controlling an intensity of light emitted from a light source; and
(d) applying a voltage to a respective plurality of pixels provided in the display, in the step (c), in a first display period, the light source being controlled to emit the light having a given intensity, and in a second display period which is different from the first display period, the light source being controlled to emit light having a lower intensity than the given intensity of the light emitted in the first display period, and in the step (d), in the first display period, the voltage being applied so as to display a given gradation in a first region which is a part of the image, the voltage being in accordance with the given gradation, and in the second display period, a higher voltage being applied so as to display the given gradation in a second region which is a part of the image and is different from the first region, the higher voltage being higher than the voltage applied to display the given gradation in the first region.

* * * * *